(12) United States Patent
Wan et al.

(10) Patent No.: US 11,694,102 B2
(45) Date of Patent: Jul. 4, 2023

(54) EXPLANATION-DRIVEN REASONING ENGINE

(71) Applicant: Accenture Global Solutions Limited, Dublin (IE)

(72) Inventors: Dadong Wan, Palatine, IL (US); Mohamad Mehdi Nasr-Azadani, Menlo Park, CA (US); Charles Anthony Locascio, San Leandro, CA (US); Erin Blake Wetherly, San Francisco, CA (US); Jacob Charles Metzger, San Rafael, CA (US); Maria Margaret Fabbroni, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 931 days.

(21) Appl. No.: 16/401,856

(22) Filed: May 2, 2019

(65) Prior Publication Data

US 2020/0349455 A1 Nov. 5, 2020

(51) Int. Cl.
*G06F 16/00* (2019.01)
*G06N 5/045* (2023.01)
(Continued)

(52) U.S. Cl.
CPC ............ *G06N 5/045* (2013.01); *G06F 16/335* (2019.01); *G06F 16/3322* (2019.01); *G06F 16/381* (2019.01); *G06N 20/00* (2019.01)

(58) Field of Classification Search
CPC .. G06F 16/3322; G06F 16/381; G06F 16/335; G06F 16/248; G06F 16/951;
(Continued)

(56) References Cited

U.S. PATENT DOCUMENTS 9,619,483 B1* 4/2017 Robinson .............. G06F 16/951
2014/0280236 A1* 9/2014 Faller ................ G06F 16/24578
707/749

(Continued)

OTHER PUBLICATIONS

Wikipedia, "Explainable artificial intelligence", https://en.wikipedia.org/wiki/Explainable_artificial_intelligence, Apr. 4, 2019, 5 pages.

(Continued)

*Primary Examiner* — Tyler J Torgrimson
(74) *Attorney, Agent, or Firm* — Harrity & Harrity, LLP

(57) ABSTRACT

A device may receive a request to identify items that satisfy parameters of the request. The device may identify a plurality of items that satisfy the parameters. The device may generate a plurality of explanation sets. An explanation set of the plurality of explanation sets may relate to an item of the plurality of items. The explanation set may include at least one of: a positive explanation indicating that the item is positively associated with a first characteristic that relates to a first preference of a user, or a negative explanation indicating that the item is negatively associated with a second characteristic that relates to a second preference of the user. The device may select an item from the plurality of items based on the plurality of explanation sets. The device may provide information that includes an explanation set of the item selected.

20 Claims, 10 Drawing Sheets

(51) Int. Cl.
*G06N 20/00* (2019.01)
*G06F 16/332* (2019.01)
*G06F 16/335* (2019.01)
*G06F 16/38* (2019.01)

(58) Field of Classification Search
CPC .......... G06F 16/24578; G06F 16/9535; G06N 5/045; G06N 20/00
See application file for complete search history.

(56) References Cited

U.S. PATENT DOCUMENTS

| | | | |
|---|---|---|---|
| 2017/0139919 A1* | 5/2017 | Ball | G06F 16/24578 |
| 2017/0139921 A1* | 5/2017 | Ball | G06F 16/24578 |
| 2017/0142044 A1* | 5/2017 | Ball | H04L 51/52 |
| 2018/0033102 A1* | 2/2018 | Duault | G06Q 30/0201 |

OTHER PUBLICATIONS

Khalil Muhammad et al.. "Great Explanations: Opinionated Explanations for Recommendation", Sep. 30, 2015, 15 pages.

* cited by examiner

EXPLANATION-DRIVEN REASONING ENGINE

BACKGROUND

Explainable artificial intelligence (AI) can be programmed to describe a purpose, a rationale, and/or a decision-making process of the AI in a way that can be understood by a human. Explainable AI is in contrast to "black box" AI, which is opaque, even to designers of the AI, as to why the AI arrived at a specific decision.

SUMMARY

According to some implementations, a method may include receiving, by a device and from a user device, a request to identify one or more items that satisfy one or more parameters of the request. The user device may be associated with a user. The user may be associated with a plurality of preferences, and a preference of the plurality of preferences may relate to a characteristic of the one or more items. The method may include identifying, by the device, a plurality of items that satisfy the one or more parameters and generating, by the device, a plurality of explanation sets. An explanation set of the plurality of explanation sets may relate to an item of the plurality of items. The explanation set may include at least one of: a positive explanation indicating that the item is positively associated with a first characteristic that relates to a first preference of the user, or a negative explanation indicating that the item is negatively associated with a second characteristic that relates to a second preference of the user. The method may include selecting, by the device, a particular item from the plurality of items based on the plurality of explanation sets. The particular item selected may be associated with a particular explanation set of the plurality of explanation sets. The method may include transmitting, by the device and to the user device, information associated with the particular item selected. The information may include the particular explanation set of the particular item selected.

According to some implementations, a device may include one or more memories, and one or more processors, communicatively coupled to the one or more memories, to receive, from a user, a request to identify one or more items that satisfy one or more parameters of the request. The user may be associated with a plurality of preferences, and a preference of the plurality of preferences may relate to a characteristic of the one or more items. The one or more processors may identify a plurality of items that satisfy the one or more parameters and generate a plurality of explanation sets. An explanation set of the plurality of explanation sets may relate to an item of the plurality of items. The explanation set may include at least one of: a positive explanation indicating that the item is positively associated with a first characteristic that relates to a first preference of the user, or a negative explanation indicating that the item is negatively associated with a second characteristic that relates to a second preference of the user. The one or more processors may select a particular item from the plurality of items based on the plurality of explanation sets. The particular item selected may be associated with a particular explanation set of the plurality of explanation sets. The one or more processors may provide, to the user, information associated with the particular item selected. The information may include the particular explanation set of the particular item selected.

According to some implementations, a non-transitory computer-readable medium may store one or more instructions that include one or more instructions that, when executed by one or more processors of a device, cause the one or more processors to receive, from a user device, a request to identify one or more items that satisfy one or more parameters of the request. The user device may be associated with a user. The user may be associated with a plurality of preferences, and a preference of the plurality of preferences may relate to a characteristic of the one or more items. The one or more instructions may cause the one or more processors to identify a plurality of items that satisfy the one or more parameters and generate a plurality of explanation sets. An explanation set of the plurality of explanation sets may relate to an item of the plurality of items. The explanation set may include at least one of: a positive explanation indicating that the item is positively associated with a first characteristic that relates to a first preference of the user, or a negative explanation indicating that the item is negatively associated with a second characteristic that relates to a second preference of the user. The explanation set may be associated with a score based on positive explanations included in the explanation set and negative explanations included in the explanation set. The one or more instructions may cause the one or more processors to select a particular item from the plurality of items based on a plurality of scores. The particular item selected may be associated with a particular explanation set of the plurality of explanation sets. The one or more instructions may cause the one or more processors to transmit, to the user device, information associated with the particular item selected. The information may include the particular explanation set of the particular item selected.

DETAILED DESCRIPTION

Figure 1A:
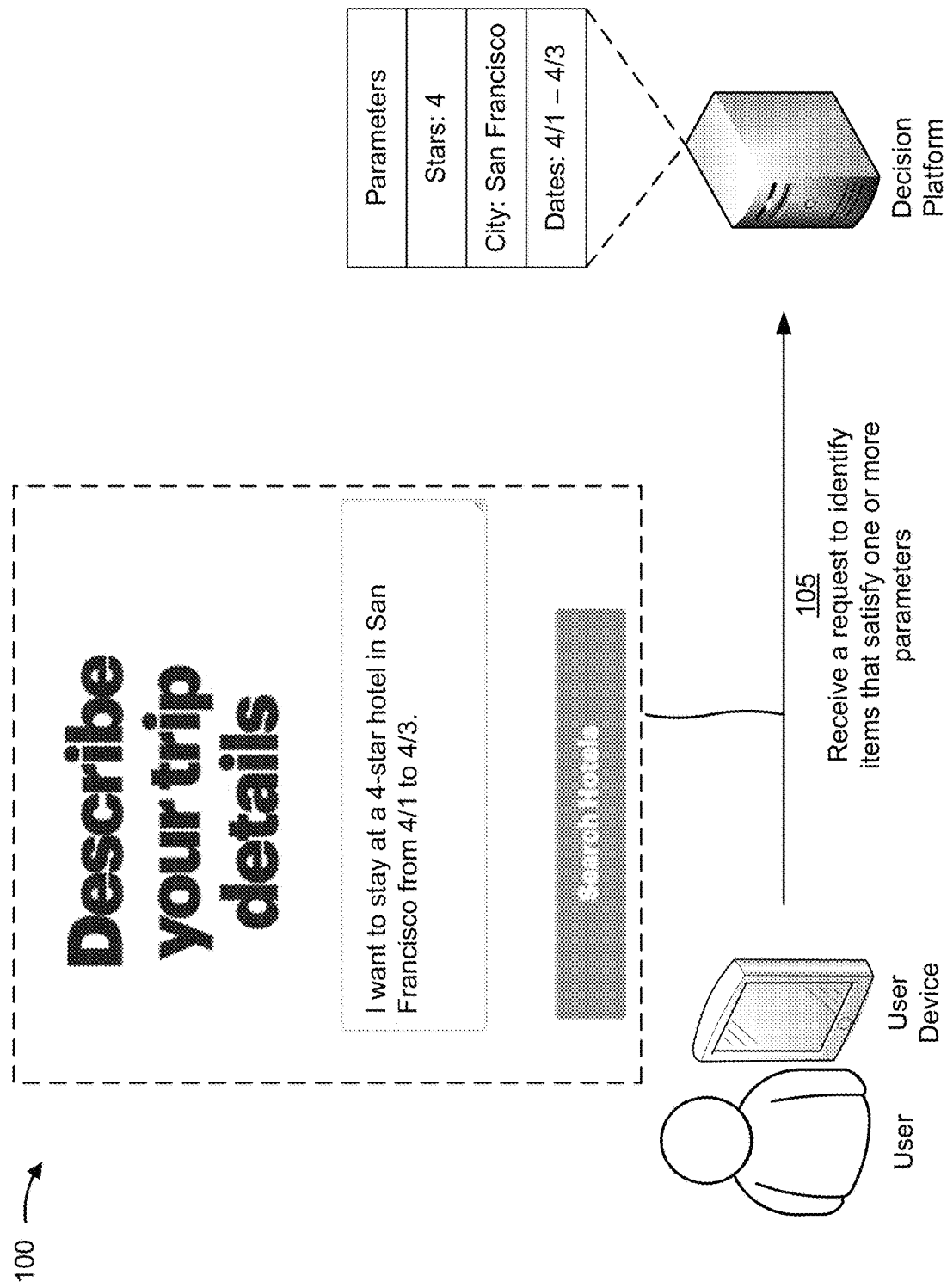
FIGS. 1A-1E are diagrams of one or more example implementations described herein.

The following detailed description of example implementations refers to the accompanying drawings. The same reference numbers in different drawings may identify the same or similar elements.

As mentioned above, black box AI systems (e.g., an artificial neural network) generate decisions (e.g., a prediction, a recommendation, and/or the like) using complex, multi-dimensional methods that cannot be interpreted by a human. Accordingly, a decision provided by a black box AI system cannot be examined by a human to determine reasons why the black box AI system reached the decision. For example, a black box AI system associated with an autonomous vehicle may determine a course of action that causes the autonomous vehicle to crash. However, the black box AI system of the autonomous vehicle is not capable of explaining a reasoning that led to the determined course of action causing the crash. Accordingly, a technician may consume considerable computing resources (e.g., processor resources, memory resources, and/or the like) attempting to identify a reasoning of the black box AI system, troubleshoot the black box AI system and/or the autonomous vehicle, adjust parameters of the black box AI system, and/or the like.

Furthermore, a decision provided by a black box AI system may not be trusted by a human due to a lack of transparency. For example, a user interacting with a black box AI system that provides recommendations (e.g., hotel recommendations, movie recommendations, and/or the like) may attempt to steer the black box AI system toward recommendations thought by the user to be more reliable. Accordingly, the user may make numerous queries to the black box AI system with various combinations of keywords, filters, sorting techniques, and/or the like until a recommendation found suitable by the user is presented. This wastes computing resources (e.g., processor resources, memory resources, and/or the like) and/or network resources that would otherwise be conserved if the user were to trust the recommendations of the black box AI system or if the user were able to interact directly with a reasoning for the recommendations.

Current explainable AI systems provide explanations for a decision of a black box AI system in an attempt to address some of the issues noted above. However, current explainable AI systems attempt to model (e.g., using a heuristic technique), or otherwise understand, a decision provided by a black box AI system. Accordingly, current explainable AI systems remain opaque and may provide an explanation that incorrectly identifies a reasoning of the black box AI system. Moreover, current explainable AI systems perform processing (e.g., processing associated with modeling a decision of the black box AI system) that is in addition to processing performed by the black box AI system in reaching a decision. Thus, current explainable AI systems increase consumption of computing resources.

Some implementations described herein provide for a decision platform that determines a decision based on explanation sets generated by the decision platform. For example, as part of a reasoning process, the decision platform may generate a plurality of explanation sets for respective items of a plurality of items and select an item from the plurality of items based on the plurality of explanation sets. Continuing with the previous example, the decision platform may provide (e.g., to a user) information associated with the item selected, such as an explanation set associated with the item selected.

In this way, the decision platform uses explanations as part of a reasoning of the decision platform to determine a decision. In other words, the decision platform can provide explanations for a decision that reflect the actual reasoning employed by the decision platform in reaching the decision. Accordingly, the decision platform facilitates human understanding of a reasoning employed by the decision platform.

For example, the decision platform permits a technician, when investigating a faulty decision (e.g., a faulty decision that led to an autonomous vehicle crash), to examine a reasoning (e.g., one or more explanation sets) that led to the faulty decision in a way that is easily understood by a human. Accordingly, the decision platform improves an efficiency associated with identifying a reasoning of an AI system, troubleshooting the AI system, adjusting parameters of the AI system, and/or the like, thereby conserving computing resources. As another example, the decision platform permits a user to quickly identify one or more factors that led to recommendations, and interact with the one or more factors, to efficiently steer the recommendations toward a suitable set. In this way, the decision platform reduces a need for a user to make numerous queries in order to obtain a desired result, thereby conserving computing resources and/or network resources.

Furthermore, the decision platform improves an efficiency of explainable AI. For example, current explainable AI systems expend computing resources when generating explanations for a reasoning of a black box AI system. The decision platform generates explanations as part of, and as a basis for, a reasoning of the decision platform. Accordingly, the decision platform provides a streamlined process that conserves computing resources.

FIGS. 1A-1E are diagrams of one or more example implementations 100 described herein. As shown in FIGS. 1A-1E, example implementation(s) 100 may include a decision platform (e.g., a decision platform including one or more server devices) and a user device (e.g., a smart phone, a laptop computer, a desktop computer, a wearable communications device, an autonomous vehicle, an Internet of things (IoT) device, a digital assistant device, and/or the like) of a user. In some implementations, the decision platform may be a process implemented on the user device.

The decision platform may identify one or more items in response to a request from the user (e.g., via the user device). As used herein, items may refer to actions, objects (e.g., physical objects or virtual objects), services, concepts, and/or the like. For example, the decision platform may utilize data relating to concepts (e.g., diseases) to determine a decision (e.g., predict a diagnosis). Furthermore, as used herein, decisions may refer to predictions, recommendations, classifications, scores, and/or the like.

As shown in FIG. 1A, and by reference number 105, the decision platform may receive a request to identify one or more items that satisfy one or more parameters. For example, the decision platform may receive a request from the user device to identify one or more items that satisfy one or more parameters determined by the user of the user device. The one or more parameters of the request may be input by the user using a user interface associated with the decision platform.

In some implementations, the request may be received by the decision platform as a structured query that identifies the one or more parameters (e.g., "Item: Hotel; Stars: 4; City: San Francisco"). Additionally, or alternatively, the request may be received by the decision platform as an unstructured query that identifies the one or more parameters ("I want to stay at a 4-star hotel in San Francisco"). In such cases, the decision platform may identify the one or more parameters from the unstructured query. For example, the decision platform may use one or more AI techniques, such as machine learning, deep learning, and/or the like to identify the one or more parameters from the unstructured query.

In some implementations, the decision platform may determine one or more parameters of a request based on natural language processing of the unstructured query. For example, based on a description of the one or more parameters being "I want to stay at a 4-star hotel in San Francisco," the decision platform may use natural language processing to determine that the user is requesting a hotel that satisfies the parameters of being rated 4-stars and located in San Francisco. In this way, the decision platform may identify features associated with recognizing parameters (e.g., using names, word formatting, sentence structure, and/or the like), determining parameter relationships and/or characteristics of parameters, and/or identifying parameter representations.

In some implementations, the decision platform may make a determination to identify one or more items (e.g., without receiving a request) based on an input to the decision platform. For example, the decision platform (e.g., a decision platform associated with an autonomous vehicle) may make a determination to identify one or more alternative routes for the autonomous vehicle based on an input of traffic information to the decision platform.

The decision platform may store, or have access to another device that stores, data relating to items (e.g., a set of items from which the decision platform is to identify the one or more items). Data relating to an item may include an identifier of the item (e.g., a unique identifier), a name of the item, a description of the item, and/or the like. In an example in which the items are hotels, data relating to a hotel may include a unique identifier of the hotel, a brand of the hotel, an address of the hotel, a star rating for the hotel, and/or the like. Data relating to an item also may include data for a plurality of characteristics (e.g., features) that relate to the item. In the example in which the items are hotels, the plurality of characteristics for a hotel may relate to a staff of the hotel, a locale of the hotel, guest rooms of the hotel, parking at the hotel, Internet of the hotel, a fitness center of the hotel, and/or the like.

In some implementations, the decision platform, or another device, may determine the plurality of characteristics that relate to the items. For example, the decision platform, or another device, may perform natural language processing, in a manner similar to that discussed above regarding determining parameters, on unstructured data relating to the items (e.g., user reviews, expert reviews, news articles, and/or the like) to determine the plurality of characteristics that relate to the items. In the example in which the items are hotels, the decision platform may perform natural language processing on user hotel reviews, expert hotel reviews, and/or the like to determine a plurality of characteristics that relate to hotels (e.g., locale, guest rooms, fitness center, and/or the like).

The decision platform, or another device, also may determine, for each item, data for the plurality of characteristics. Data for the plurality of characteristics may provide an indication (referred to herein as an "association identifier") of whether an item is positively associated with a characteristic or negatively associated with the characteristic. For example, data for a characteristic may be a binary value (e.g., "0" or "1," "positive" or "negative," "pro" or "con," and/or the like) or a score value (e.g., a score value on a scale from 0 to 10, 0 to 100, and/or the like). As another example, data for a characteristic may be a sentiment value (e.g., a sentiment value on a scale from −1 to 1 (where −1 indicates a most negative sentiment and 1 indicates a most positive sentiment), a scale from 0 to 1 (where 0 indicates a most negative sentiment and 1 indicates a most positive sentiment), and/or the like).

A score value or a sentiment value may indicate a positive association when the score value or the sentiment value satisfies a threshold value. Conversely, the score value or the sentiment value may indicate a negative association when the score value or the sentiment value does not satisfy the threshold value. A positive association of a characteristic and an item may indicate that that the item has the characteristic, that the item has a value for the characteristic that satisfies a threshold value, that the item has a value for the characteristic that is greater than values that one or more other items have for the characteristic, that the value for the characteristic of the item is in a particular percentile relative to values that one or more other items have for the characteristic, and/or the like. Conversely, a negative association of a characteristic and an item may indicate that that the item does not have the characteristic, that the item has a value for the characteristic that does not satisfy a threshold value, that the item has a value for the characteristic that is less than values that one or more other items have for the characteristic, that the value for the characteristic of the item is not in a particular percentile relative to values that one or more other items have for the characteristic, and/or the like.

In some implementations, the decision platform, or another device, may obtain data for the plurality of characteristics as structured data, such as ratings (e.g., user ratings). For example, the decision platform may provide a user interface in which a user may rate an item on one or more of the plurality of characteristics. The decision platform may aggregate ratings relating to a characteristic to determine a score value or a binary value for the characteristic. For example, the decision platform may determine a binary value for a characteristic based on whether aggregated ratings for the characteristic satisfy a threshold value.

In some implementations, the decision platform, or another device, may obtain data for the plurality of characteristics as unstructured data (e.g., by scraping data, such as ratings or reviews, from one or more websites). In such a case, the decision platform, or another device, may derive data (e.g., a sentiment value) for a characteristic of an item from the unstructured data (e.g., user reviews relating to the item, expert reviews relating to the item, news articles relating to the item, and/or the like). For example, the decision platform, or another device, may perform natural language processing on the unstructured data, in a manner similar to that described above for determining parameters, to determine keywords (e.g., nouns) that are commonly used in describing the items. For example, a keyword may be commonly used when a number of times that the keyword appears in the unstructured data satisfies a threshold number, or a percentage of times that the keyword appears in the unstructured data (e.g., relative to other keywords) satisfies a threshold percentage.

After determining the keywords, the decision platform, or another device, may determine an association between a keyword and a characteristic of the items. For example, the decision platform, or another device, may determine the association by calculating a similarity score (e.g., by k-means clustering) for the keyword and each of the plurality of characteristics, and associating the keyword with a characteristic having a highest similarity score.

The decision platform, or another device, may use natural language processing, such as sentiment analysis (e.g., a knowledge-based sentiment analysis technique, a statistical sentiment analysis technique, and/or the like), on the unstructured data to determine sentiment scores for text (e.g., a sentence, a paragraph, and/or the like) in which a keyword appears, and associate a sentiment score with a characteristic to which the keyword relates. The decision platform, or another device, may determine a sentiment value for a characteristic as an aggregate value (e.g., an average value) of sentiment scores for keywords relating to the characteristic. In some implementations, the sentiment value may be used to determine a binary value or a score value for a characteristic.

In this way, data (e.g., a binary value, a score value, a sentiment value, and/or the like) for a characteristic of an item provides an indication as to whether the characteristic is positively associated or negatively associated with the item. Moreover, the data is provided in a format (e.g., "pro" or "con," 0-100, and/or the like) that is easily understandable by a human.

In some implementations, keywords may be included in, and/or used to generate, a knowledge graph associated with the characteristic and/or the items. For example, the knowledge graph may identify an association between a sentiment relating to a characteristic and a keyword as well as an association between a characteristic and an item, as described below.

Figure 1B:
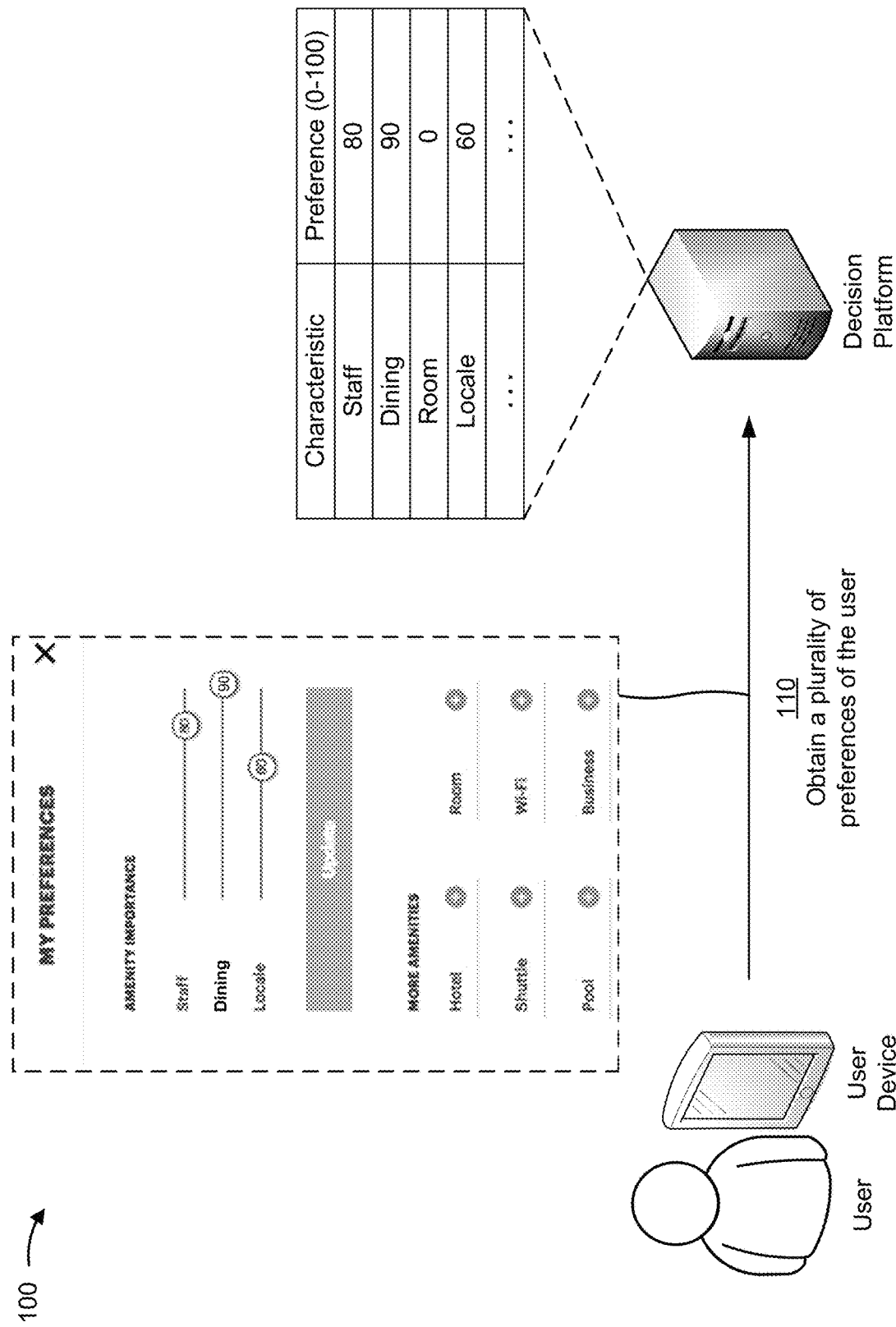

As shown in FIG. 1B, and by reference number 110, the decision platform may obtain a plurality of preferences of the user. A preference of the plurality of preferences may relate to a characteristic of the plurality of characteristics. In the example in which the items are hotels, a preference may indicate whether staff at a hotel is important to the user, whether guest rooms at the hotel are important to the user, whether Internet at the hotel is important to the user, among other characteristics. These characteristics are simply intended as examples of characteristics that might be used in practice. In some implementations, a preference may indicate a degree of importance of a characteristic to the user (e.g., on a scale from 0-10, a scale from 0-100, and/or the like). In some implementations, a preference may be expressed as a binary value representing whether a characteristic is important to the user (e.g., "0" or "1," "important" or "not important," and/or the like).

The decision platform may provide a user interface in which a user may input one or more preferences. Accordingly, the decision platform may obtain the plurality of preferences of the user as structured data (e.g., "Staff: 80; Dining: 90; Locale: 60"). Additionally, or alternatively, the decision platform, or another device, may determine one or more preference of the user from unstructured data associated with the user and relating to the items (e.g., reviews of the items posted by the user, reviews of the items saved or liked by the user, reviews of the items accessed by the user, and/or the like). For example, the decision platform, or another device, may use natural language processing, in a manner similar to that described above regarding determining parameters, on the unstructured data to identify a characteristic of the items that is important, or otherwise relevant, to the user. In such a case, the decision platform, or another device, may associate the characteristic identified with the plurality of preferences of the user. For example, if a threshold number of hotel reviews posted by the user describe a quality of dining at hotels, the decision platform, or another device, may identify dining as a characteristic that is important to the user and associate dining with the plurality of preferences of the user.

As another example, the decision platform, or another device, may identify a characteristic relating to an item in a review accessed by the user and associate the characteristic with the plurality of preferences of the user based on one or more further actions of the user. For example, the decision platform, or another device, may associate the characteristic with the plurality of preferences of the user if the user purchases the item described in the review (e.g., books a hotel described in a review) after accessing the review. As another example, the decision platform, or another device, may associate the characteristic with the plurality of preferences of the user based on one or more searches (e.g., keywords and/or filters of one or more searches) performed by the user after accessing the review (e.g., if a keyword or a filter relates to the characteristic).

Additionally, the decision platform, or another device, may use natural language processing, such as sentiment analysis (e.g., a knowledge-based sentiment analysis technique, a statistical sentiment analysis technique, and/or the like), on the unstructured data to determine a sentiment of the user (e.g., a sentiment score) towards the characteristic. In such a case, the decision platform may determine a degree of importance of the characteristic to the user based on a sentiment score associated with the characteristic or based on an aggregate of sentiment scores associated with the characteristic.

In this way, data for a preference of the user provides an indication as to whether a characteristic of the items is important or not important to the user. Moreover, the indication is provided in a format (e.g., "important" or "not important," 0-100, and/or the like) that is easily understandable by a human.

In some implementations, the decision platform, or another device, may determine one or more preferences for a first user based on one or more preferences of a second user. For example, the decision platform, or another device, may determine that one or more attributes of the first user (e.g., age, gender, income, location, purchase history, search history, browsing behavior, and/or the like) are the same as, or similar to, one or more attributes of the second user and, as a result, may determine that one or more preferences of the second user are to be associated with the first user. As another example, the decision platform, or another device, may determine that one or more preferences of the first user are the same as, or similar to, one or more preferences of the second user and, as a result, may determine that one or more additional preferences of the second user are to be associated with the first user.

In some implementations, the decision platform may prompt the user to input one or more preferences prior to, or after, the user transmits the request to the decision platform. The decision platform, or another device accessible to the decision platform, may store (e.g., in a data structure) the one or more preferences provided by the user. The decision platform may use stored preferences of the user in a subsequent interaction between the user and the decision platform. For example, the decision platform may prompt the user to confirm or update the stored preferences prior to, or after, the user transmits a subsequent request to the decision platform.

Figure 1C:
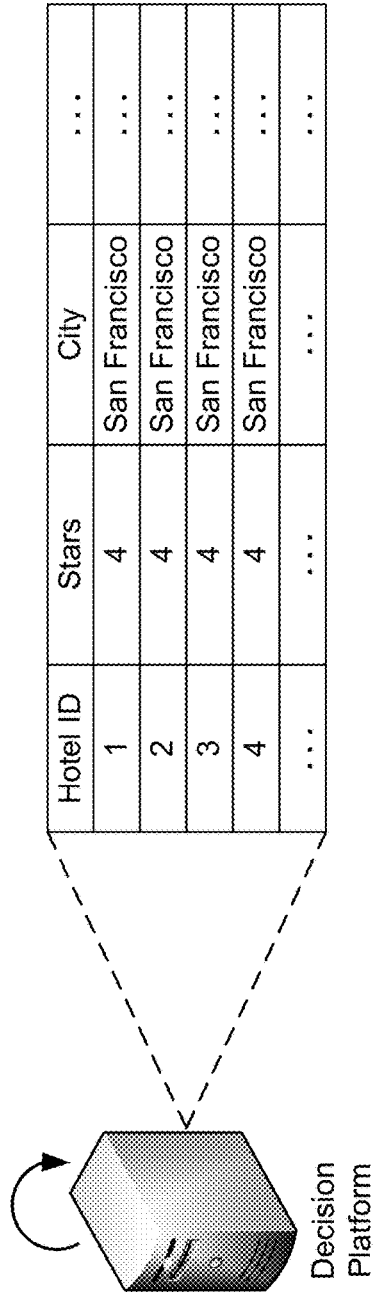

As shown in FIG. 1C, and by reference number 115, the decision platform may identify a plurality of items that satisfy the one or more parameters of the request. For example, if the one or more parameters indicate that the user is requesting a hotel in San Francisco that is 4-stars and available from April $1^{st}$ to April $3^{rd}$, the decision platform may identify a plurality of hotels that are located in San Francisco, have a rating of 4-stars, and available from April $1^{st}$ to April $3^{rd}$.

In some implementations, the decision platform may use one or more AI techniques, such as machine learning, deep learning, and/or the like to identify the plurality of items that satisfy the one or more parameters of the request. For example, the decision platform may use a machine learning model to identify the plurality of items. The decision platform may train the machine learning model (or receive a trained machine learning model) based on one or more features associated with the items. In the example in which the items are hotels, the one or more features may include location, rating, amenities, guest room pricing, and/or the like. The decision platform may train the machine learning model, according to the one or more features, using historical data associated with requests and/or user interactions with items returned for requests (e.g., whether a user purchased an item returned for a request). Using the historical data and the one or more features as inputs to the machine learning model, the decision platform may identify the plurality of items that satisfy one or more parameters of the request.

In some implementations, the decision platform, using the machine learning model, may assign a relevance score to an item based on a degree to which the item satisfies the one or more parameters. In the example in which the items are hotels, the decision platform, using the machine learning model, may determine that a request for a hotel located in San Francisco is satisfied by a hotel located in Oakland. In such a case, the decision platform, using the machine learning model, may assign a relevance score to the hotel in Oakland that is lower than a relevance score assigned to a hotel in San Francisco to reflect a difference in a degree to which the hotels satisfy the request. The decision platform may include, in the plurality of items identified, an item assigned a score that satisfies a threshold value.

Figure 1D:
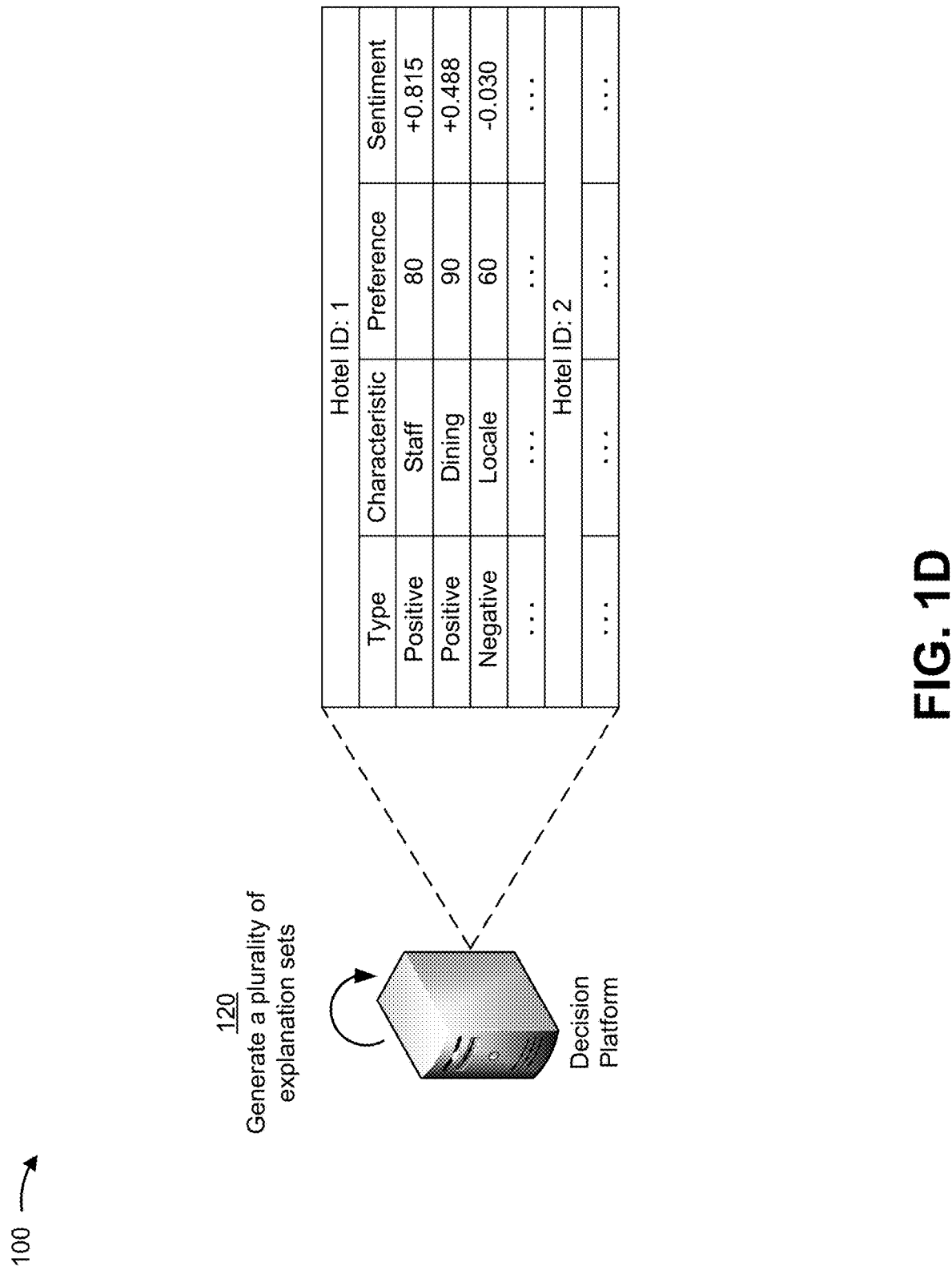

As shown in FIG. 1D, and by reference number 120, the decision platform may generate a plurality of explanation sets. An explanation set of the plurality of explanation sets may relate to an item of the plurality of items identified. Accordingly, the decision platform may generate the plurality of explanation sets by integrating data relating to the user and data relating to the plurality of items identified. For example, the decision platform may generate an explanation set for an item by integrating data relating to preferences of the user and data relating to characteristics of the item.

In some implementations, the decision platform may generate an explanation set based on a knowledge graph (e.g., a knowledge domain arranged in a hierarchical network of nodes and links). In such a case, the knowledge graph may provide a data source that can be integrated as a part of the explanation set. For example, the knowledge graph may identify associations between characteristics and items, associations between a characteristic of an item and one or more components of the characteristic, associations between a component of the characteristic and one or more sub-components of the component, and so forth. In the example in which the items are hotels, a knowledge graph may identify associations between characteristics (e.g., dining, staff, locale, and/or the like) and a hotel, associations between a characteristic (e.g., dining) and a component of the characteristic (e.g., breakfast), as well as associations between a component (e.g., breakfast) and a sub-component of the component (e.g., coffee). An association of a knowledge graph may identify whether the association is positive or negative (e.g., based on a binary value, a score value, a sentiment value, and/or the like).

An explanation set for an item may include one or more explanations. An explanation of the explanation set may relate to a characteristic of the item (e.g., a characteristic of the item that relates to a preference of the user). The explanation may include an identifier of a characteristic of the item (e.g., "staff"), an identifier of a preference of the user relating to the characteristic (e.g., "80 out of 100"), and an identifier (e.g., an association identifier) of an association between the characteristic and the item. In this way, an explanation set facilitates human understanding of a reason why, or why not, an item may respond to the query of the user. For example, an explanation for a hotel of [Characteristic: Dining; Preference: 80; Sentiment Value: +0.815] can be understood by a human as indicating that a positive reason (e.g., a "pro") for selecting the hotel is because the user has a strong preference (e.g., a preference of 80 out of 100) for hotels with positively rated dining options, and the hotel has dining options that are positively rated (e.g., a sentiment value of +0.815).

An explanation may be further characterized according to one or more components of a characteristic of the explanation. For example, an explanation may be further characterized according to a knowledge graph. Continuing with the example explanation above ([Characteristic: Dining; Preference: 80; Sentiment Value: +0.815]), the decision platform may further characterize the explanation (e.g., based on a knowledge graph) according to a reason for the explanation, such as that the positively rated dining options at the hotel are due to a quality of breakfast at the hotel. A reason for an explanation may be included as part of the explanation or may be a separate explanation in the explanation set.

In some implementations, an explanation may relate to a relevance score assigned to an item (e.g., a relevance score assigned to the item during identification of the plurality of items), as described above. For example, the explanation may indicate that a positive reason (e.g., a "pro") for selecting the item is because the item is associated with a relevance score that satisfies a threshold value.

An explanation set may include one or more positive explanations (e.g., "pros") and/or one or more negative explanations (e.g., "cons"). A positive explanation may indicate that the item is positively associated with a characteristic (e.g., data associated with the characteristic, such as a sentiment value or a binary value, indicates a positive association) that relates to a preference of the user. A negative explanation may indicate that the item is negatively associated with a characteristic (e.g., data associated with the characteristic, such as a sentiment value or a binary value, indicates a negative association) that relates to a preference of the user.

In some implementations, the decision platform may classify an explanation of an explanation set for an item as a positive explanation or a negative explanation based on an association identifier of the explanation. For example, the decision platform may classify the explanation as a positive explanation when a value of the association identifier (e.g., a sentiment value) satisfies a threshold value (or classify the explanation as a negative explanation when the value does not satisfy the threshold value). As another example, the decision platform may classify the explanation as a positive explanation based on a value of the association identifier (e.g., a binary value) indicating a positive association (or classify the explanation as a negative explanation based on the value indicating a negative association). In some implementations, the decision platform may characterize an explanation set according to a positive explanation subset (e.g., "pros") and a negative explanation subset (e.g., "cons") based on classifications of explanations. Additionally, or alternatively, the decision platform may use classifications of explanations to evaluate the plurality of explanation sets, as described below.

Figure 1E:
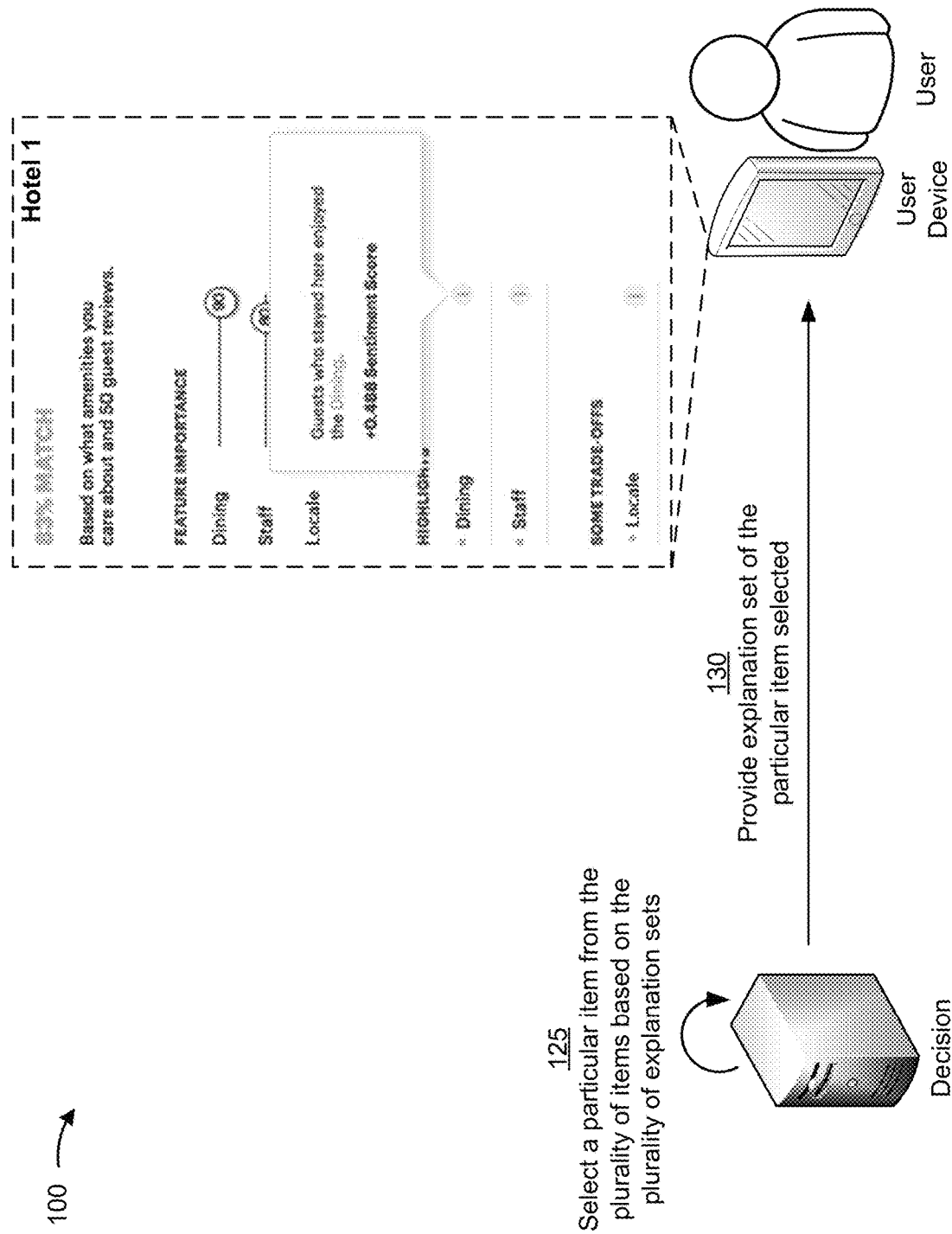

As shown in FIG. 1E, and by reference number 125, the decision platform may select a particular item from the plurality of items identified based on the plurality of explanation sets. The particular item selected may be associated with a particular explanation set of the plurality of explanation sets. The particular item selected may represent a decision, a recommendation, a prediction, and/or the like of the decision platform.

In some implementations, the decision platform may generate a respective score for the plurality of explanation sets to facilitate selection of the particular item. A score may provide a measure of likelihood that an item best responds to the request of the user based on the plurality of preferences of the user. A score may be based on an explanation set, such as positive explanations in the explanation set and/or negative explanations in the explanation set, and/or a relevance score, as described above.

For example, the score may be based on a first number of positive explanations (e.g., explanations classified as positive explanations) included in the explanation set and a second number of negative explanations (e.g., explanations classified as negative explanations) included in the explanation set (e.g., score=first number−second number). As another example, the score may be based on a ratio of the first number of positive explanations included in the explanation set to the second number of negative explanations included in the explanation set (e.g., score=first number÷second number). These techniques for generating scores are provided simply as examples of ways that scores can be generated and these examples may be suitable when the plurality of preferences of the user are expressed as binary values (e.g., "important" or "not important").

In some implementations, the score may be based on the explanation set and the plurality of preferences of the user. For example, the score may be based on a first sum of preferences (e.g., based on a degree of importance identified for a preference, such as on a scale from 0-100) associated with positive explanations and a second sum of values for preferences associated with negative explanations (e.g., score=first sum−second sum). This technique for generating scores may be suitable when the plurality of preferences of the user are expressed as non-binary values, and the plurality of association identifiers of an item are expressed as binary values (e.g., "positive" or "negative"). As another example, the decision platform may multiply a preference (e.g., a degree of importance identified for the preference, such as on a scale from 0-100)) and an association identifier (e.g., a sentiment value or a score value of the association identifier) to obtain a weighted characteristic score for a characteristic, and the score may be based on a first sum of characteristic scores associated with positive explanations and a second sum of characteristic scores associated with negative explanations (e.g., score=first sum−second sum). This technique for generating scores may be suitable when the plurality of preferences of the user and the plurality of characteristics of the item are expressed as non-binary values. In some implementations, a score for an explanation set of an item may be weighted according to a relevance score associated with the item.

In some implementations, the decision platform may use one or more AI techniques, such as machine learning, deep learning, and/or the like to generate a score for an explanation set. For example, the decision platform may use a machine learning model to generate a score. The decision platform may train the machine learning model (or receive a trained machine learning model) based on one or more features associated with the plurality of explanation sets, such as a number of positive explanations in an explanation set, a number of negative explanations in an explanation set, a strength of a positive explanation, a strength of a negative explanation, a relevance score associated with the explanation set, and/or the like. The decision platform may train the machine learning model, according to the one or more features, using historical data associated with explanation sets. Using the historical data and the one or more features as inputs to the machine learning model, the decision platform may generate scores for the plurality of explanation sets.

In some implementations, the decision platform may generate a plurality of scores (e.g., generate a score for each explanation set) and rank the plurality of items identified according to the plurality of scores. The particular item selected may be a highest ranked item of the plurality of items (e.g., an item associated with a highest score of the plurality of scores). In some implementations, the decision platform may select a configured number of highest ranked items (e.g., 5 items, 20 items, and/or the like). Additionally, or alternatively, the decision platform may select a number of items associated with scores that satisfy a threshold value.

In some implementations, the decision platform may use the particular item selected as a link in a chain of reasoning. For example, the decision platform may use the particular item selected and/or characteristics of the particular item selected as an input to generate further explanation sets to thereby select a further particular item, and so forth. For example, the decision platform may generate a first plurality of explanation sets based on one or more parameters of the request and/or the plurality of preferences, and select a first item based on the first plurality of explanation sets (e.g., a highest ranked item, as described above). The first item may be associated with one or more characteristics, parameters, and/or instructions. Continuing with the previous example, the decision platform may generate a second plurality of explanation sets based on the one or more characteristics, parameters, and/or instructions of the first item, and select a second item based on the second plurality of explanation sets (e.g., a highest ranked item, as described above), and so forth. Accordingly, a chain of reasoning can be associated with several explanation sets that facilitate human understanding of the chain of reasoning.

As shown by reference number 130, the decision platform may provide the particular explanation set of the particular item selected to the user. For example, the decision platform may provide information associated with the particular item selected that includes the particular explanation set. In some implementations, the decision platform may transmit the information to the user device of the user. In some implementations, the decision platform may provide the information to another device for further processing or to take one or more actions based on the information (e.g., a decision platform associated with an autonomous vehicle may provide the information to a braking system or a steering system of the vehicle).

In some implementations, the decision platform may generate and provide a linguistic representation of an explanation set. In the example in which the items are hotels, an explanation of the explanation set may be [Type: Positive; Characteristic: Dining; Preference: 80; Sentiment Value: +0.815]. Continuing with the previous example, a linguistic representation of the explanation may provide, "You may like this hotel because you prefer hotels with premium dining options and this hotel received high ratings for dining."

In some implementations, the decision platform may generate and provide a graphical representation of an explanation set. For example, the decision platform may generate a table, a chart, or another graphic that distinguishes the positive explanations and the negative explanations. In some implementations, the decision platform may generate a list of "pros" and "cons" for the particular item selected based on the particular explanation set. In some implementations, the decision platform may represent an explanation set using a combination of a linguistic representation, a graphical representation, a list, and/or the like. The decision platform may provide the particular explanation set, or a representation of the particular explanation set, in a user interface. For example, the decision platform may provide, in a user interface, information identifying one or more selected items (e.g., according to a ranking of the one or more selected items, as described above) and respective explanation sets for the one or more selected items.

In this way, the particular explanation set facilitates human understanding of a reasoning why the particular item was selected by the decision platform. Accordingly, when the user finds a decision of the decision platform to be faulty or unsuitable, the user may interact with the reasoning to modify the decision.

For example, the user may determine that a particular preference of the user caused the decision platform to determine a decision that is faulty or unsuitable. As another example, the user may determine that an unspecified preference of the user caused the decision platform to determine a decision that is faulty or unsuitable. In such cases, the user may update the plurality of preferences to form an updated plurality of preferences. The decision platform may receive the updated plurality of preferences and generate a plurality of updated explanation sets based on the updated plurality of preferences in a manner similar to that described above. Based on the plurality of updated explanation sets, the decision platform may select a particular item (e.g., a different particular item) from the plurality of items and provide information associated with the particular item (e.g., information that includes an explanation set associated with the particular item) to the user. In this way, the decision platform facilitates an efficient steering of a decision of the decision platform.

As indicated above, FIGS. 1A-1E are provided merely as one or more examples. Other examples may differ from what is described with regard to FIGS. 1A-1E.

Figure 2:
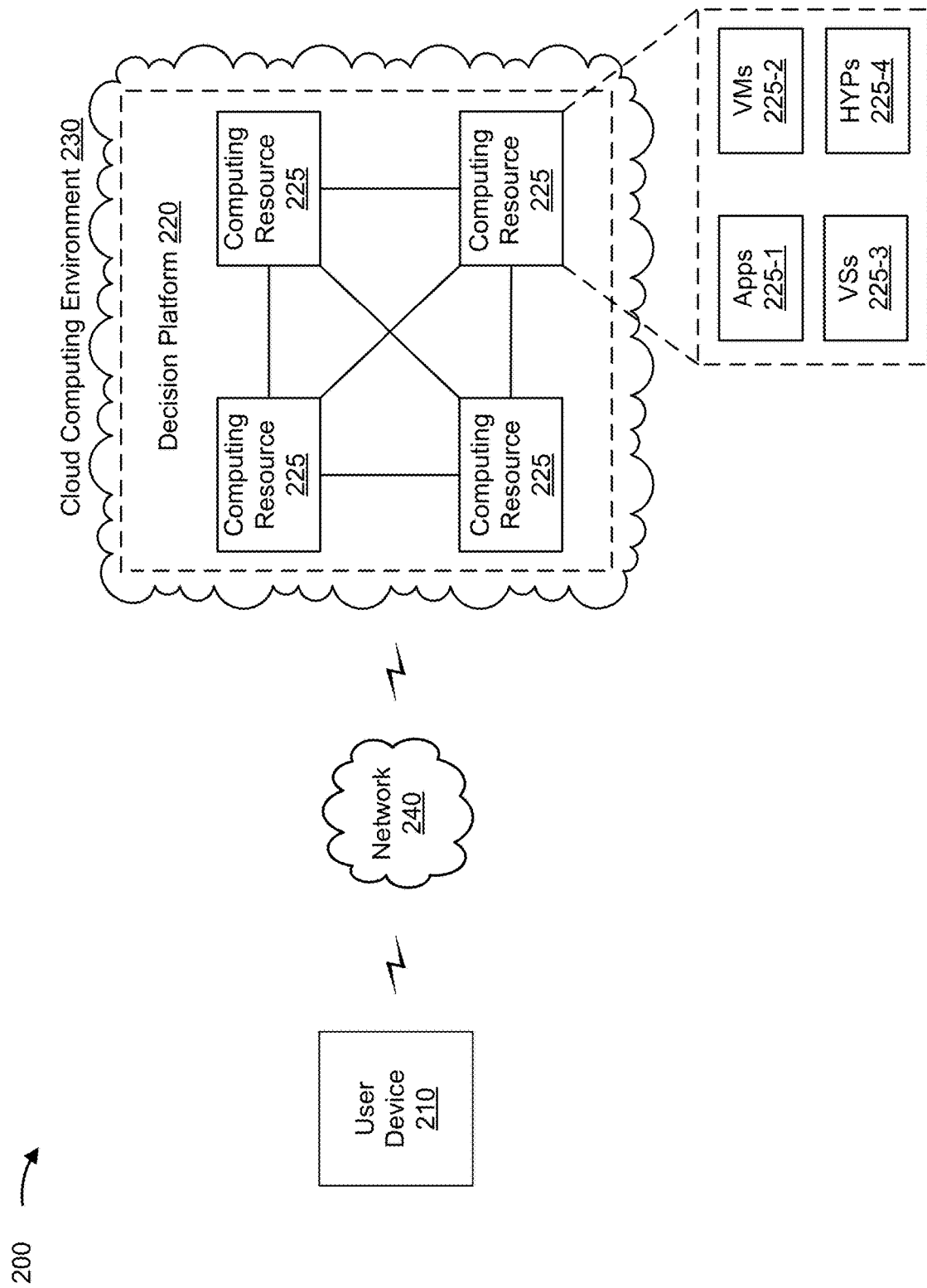
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a decision platform 220, a computing resource 225, a cloud computing environment 230, and a network 240. Devices of environment 200 may interconnect via wired connections, wireless connections, or a combination of wired and wireless connections.

User device 210 includes one or more devices capable of receiving, generating, storing, processing, and/or providing information associated with requesting identification of one or more items that satisfy one or more parameters, selecting one or more preferences, updating one or more preferences, receiving information relating to a particular item selected, and/or the like. For example, user device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), an autonomous vehicle, or a similar type of device.

Decision platform 220 includes one or more computing resources assigned to identify one or more items in response to a request from the user. For example, decision platform 220 may be a platform implemented by cloud computing environment 230 that may receive a request to identify items that satisfy one or more parameters, obtain a plurality of preferences of a user, identify a plurality of items that satisfy the one or more parameters, generate a plurality of explanation sets, select a particular item based on the plurality of explanation sets, provide an explanation set of the particular item selected, and/or the like. In some implementations, decision platform 220 is implemented by computing resources 225 of cloud computing environment 230.

Decision platform 220 may include a server device or a group of server devices. In some implementations, decision platform 220 may be hosted in cloud computing environment 230. Notably, while implementations described herein may describe decision platform 220 as being hosted in cloud computing environment 230, in some implementations, decision platform 220 may be non-cloud-based or may be partially cloud-based.

Cloud computing environment 230 includes an environment that delivers computing as a service, whereby shared resources, services, and/or the like may be provided to user device 210, and/or the like. Cloud computing environment 230 may provide computation, software, data access, storage, and/or other services that do not require end-user knowledge of a physical location and configuration of a system and/or a device that delivers the services. As shown, cloud computing environment 230 may include decision platform 220 and computing resource 225.

Computing resource 225 includes one or more personal computers, workstation computers, server devices, or another type of computation and/or communication device. In some implementations, computing resource 225 may host decision platform 220. The cloud resources may include compute instances executing in computing resource 225, storage devices provided in computing resource 225, data transfer devices provided by computing resource 225, and/or the like. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 210, and/or the like. Application 225-1 may eliminate a need to install and execute the software applications on user device 210, and/or the like. For example, application 225-1 may include software associated with decision platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program and may support a single process. In some implementations, virtual machine 225-2 may execute on behalf of a user (e.g., user device 210, and/or the like), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
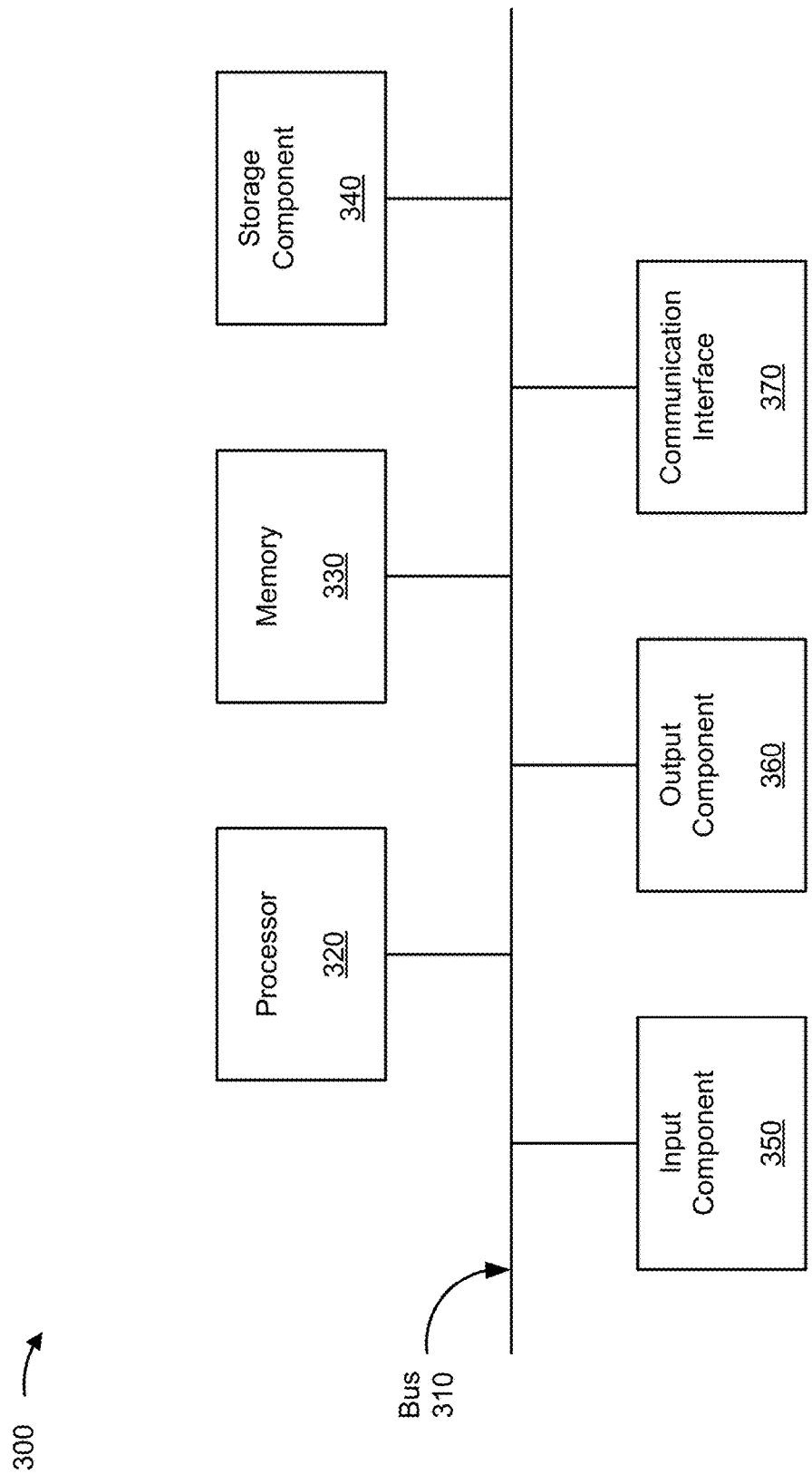
FIG. 3 is a diagram of example components of one or more devices of FIG. 2.

FIG. 3 is a diagram of example components of a device 300. Device 300 may correspond to user device 210, decision platform 220, and/or computing resource 225. In some implementations, user device 210, decision platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and/or a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
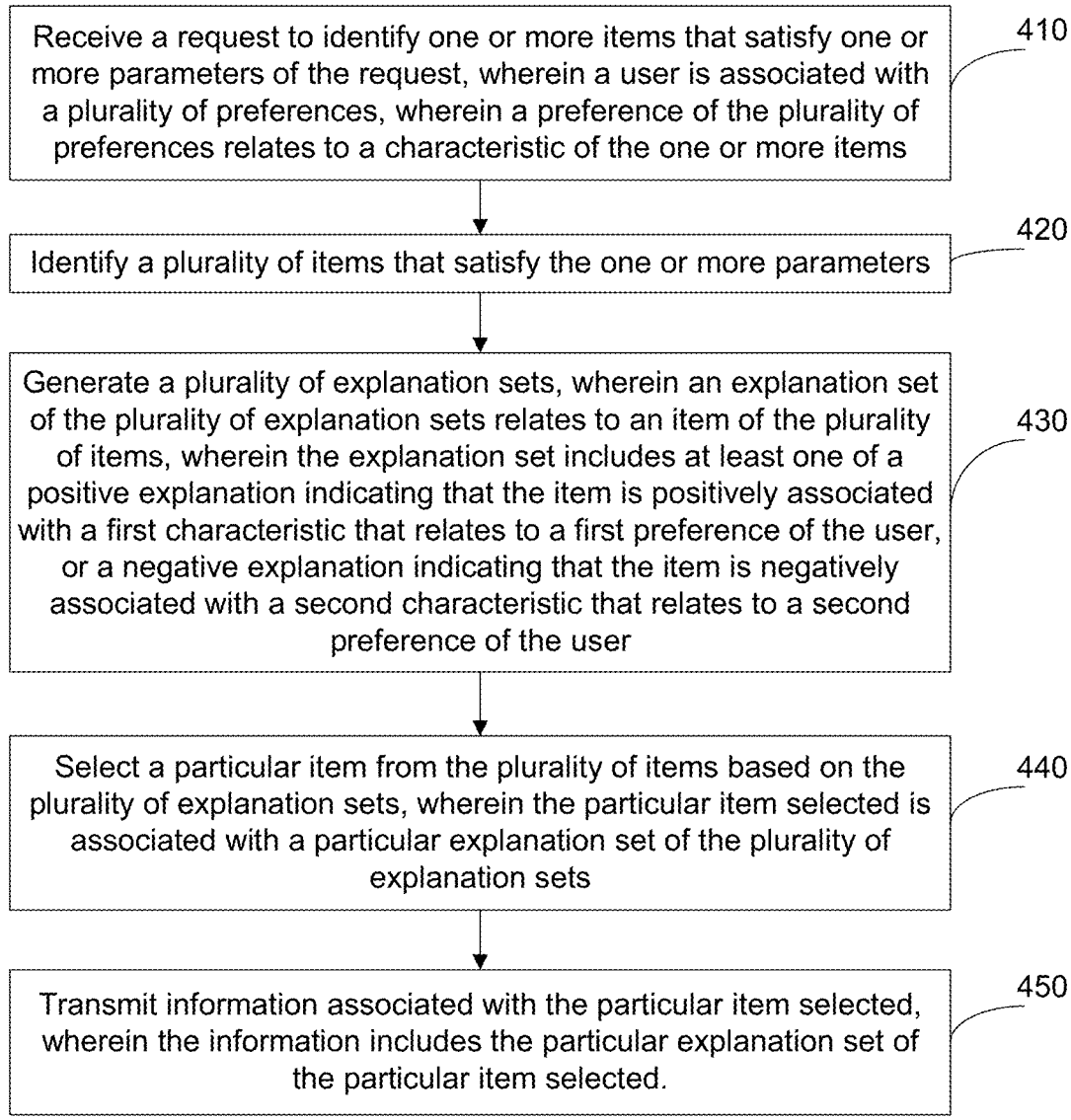
FIGS. 4-6 are flow charts of example processes for explanation-driven reasoning.

FIG. 4 is a flow chart of an example process 400 for explanation-driven reasoning. In some implementations, one or more process blocks of FIG. 4 may be performed by a decision platform (e.g., decision platform 220). In some implementations, one or more process blocks of FIG. 4 may be performed by another device or a group of devices separate from or including the decision platform, such as a user device (e.g., user device 210), and/or the like.

As shown in FIG. 4, process 400 may include receiving a request to identify one or more items that satisfy one or more parameters of the request, wherein a user is associated with a plurality of preferences, and wherein a preference of the plurality of preferences relates to a characteristic of the one or more items (block 410). For example, the decision platform (e.g., using computing resource 225, processor 320, memory 330, storage component 340, input component 350, communication interface 370, and/or the like) may receive a request to identify one or more items that satisfy one or more parameters of the request, as described above. In some implementations, a user may be associated with a plurality of preferences. In some implementations, a preference of the plurality of preferences may relate to a characteristic of the one or more items.

As further shown in FIG. 4, process 400 may include identifying a plurality of items that satisfy the one or more parameters (block 420). For example, the decision platform (e.g., using computing resource 225, processor 320, memory 330, storage component 340, and/or the like) may identify a plurality of items that satisfy the one or more parameters, as described above.

As further shown in FIG. 4, process 400 may include generating a plurality of explanation sets, wherein an explanation set of the plurality of explanation sets relates to an item of the plurality of items, and wherein the explanation set includes at least one of: a positive explanation indicating that the item is positively associated with a first characteristic that relates to a first preference of the user, or a negative explanation indicating that the item is negatively associated with a second characteristic that relates to a second preference of the user (block 430). For example, the decision platform (e.g., using computing resource 225, processor 320, memory 330, storage component 340, and/or the like) may generate a plurality of explanation sets, as described above. In some implementations, an explanation set of the plurality of explanation sets may relate to an item of the plurality of items. In some implementations, the explanation set may include at least one of: a positive explanation indicating that the item is positively associated with a first characteristic that relates to a first preference of the user, or a negative explanation indicating that the item is negatively associated with a second characteristic that relates to a second preference of the user.

As further shown in FIG. 4, process 400 may include selecting a particular item from the plurality of items based on the plurality of explanation sets, wherein the particular item selected is associated with a particular explanation set of the plurality of explanation sets (block 440). For example, the decision platform (e.g., using computing resource, 225, processor 320, memory 330, storage component 340, and/or the like) may select a particular item from the plurality of items based on the plurality of explanation sets, as described above. In some implementations, the particular item selected may be associated with a particular explanation set of the plurality of explanation sets.

As further shown in FIG. 4, process 400 may include transmitting information associated with the particular item selected, wherein the information includes the particular explanation set of the particular item selected (block 450). For example, the decision platform (e.g., using computing resource 225, processor 320, memory 330, storage component 340, output component 360, communication interface 370, and/or the like) may transmit information associated with the particular item selected, as described above. In some implementations, the information may include the particular explanation set of the particular item selected.

Process 400 may include additional implementations, such as any single implementation or any combination of implementations described below and/or in connection with one or more other processes described elsewhere herein.

In some implementations, the decision platform may generate a plurality of scores. A score of the plurality of scores may relate to one item of the plurality of items, and the score may be a ratio of positive explanations to negative explanations associated with the one item. In some implementations, the decision platform, when selecting the particular item, may select the particular item from the plurality of items based on the plurality of scores. The particular item selected may be associated with a highest score of the plurality of scores.

In some implementations, the explanation set may include one or more positive explanations and one or more negative explanations. In some implementations, the item may be positively associated with the first characteristic when a first sentiment value for the first characteristic of the item indicates a positive sentiment, and the item may be negatively associated with the second characteristic when a second sentiment value for the second characteristic of the item indicates a negative sentiment. In some implementations, the particular explanation set provides information that identifies one or more reasons that the particular item was selected.

In some implementations, the decision platform, may determine the plurality of preferences associated with the user based on natural language processing of unstructured data associated with the user. In some implementations, the request may be an unstructured query, and the decision platform may determine the one or more parameters of the request based on natural language processing of the unstructured query.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
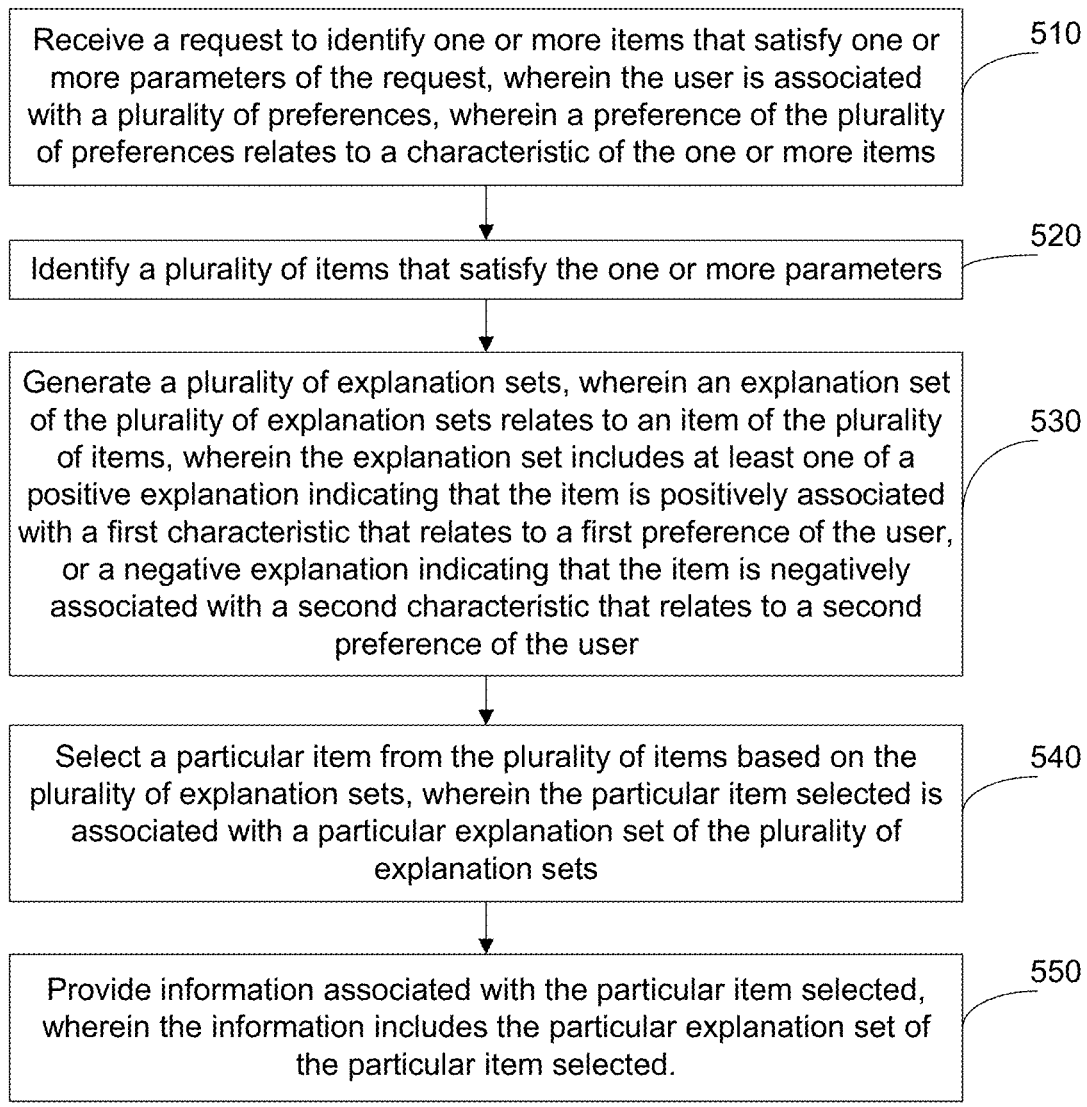

FIG. 5 is a flow chart of an example process 500 for explanation-driven reasoning. In some implementations, one or more process blocks of FIG. 5 may be performed by a decision platform (e.g., decision platform 220). In some implementations, one or more process blocks of FIG. 5 may be performed by a user device (e.g., user device 210), and/or the like.

As shown in FIG. 5, process 500 may include receiving a request to identify one or more items that satisfy one or more parameters of the request, wherein a user is associated with a plurality of preferences, and wherein a preference of the plurality of preferences relates to a characteristic of the one or more items (block 510). For example, the decision platform (e.g., using computing resource 225, processor 320, memory 330, storage component 340, input component 350, communication interface 370, and/or the like) may receive a request to identify one or more items that satisfy one or more parameters of the request, as described above. In some implementations, a user is associated with a plurality of preferences. In some implementations, a preference of the plurality of preferences relates to a characteristic of the one or more items.

As further shown in FIG. 5, process 500 may include identifying a plurality of items that satisfy the one or more parameters (block 520). For example, the decision platform (e.g., using computing resource 225, processor 320, memory 330, storage component 340, and/or the like) may identify a plurality of items that satisfy the one or more parameters, as described above.

As further shown in FIG. 5, process 500 may include generating a plurality of explanation sets, wherein an explanation set of the plurality of explanation sets relates to an item of the plurality of items, and wherein the explanation set includes at least one of: a positive explanation indicating that the item is positively associated with a first characteristic that relates to a first preference of the user, or a negative explanation indicating that the item is negatively associated with a second characteristic that relates to a second preference of the user (block 530). For example, the decision platform (e.g., using computing resource 225, processor 320, memory 330, storage component 340, and/or the like) may generate a plurality of explanation sets, as described above. In some implementations, an explanation set of the plurality of explanation sets may relate to an item of the plurality of items. In some implementations, the explanation set may include at least one of: a positive explanation indicating that the item is positively associated with a first characteristic that relates to a first preference of the user, or a negative explanation indicating that the item is negatively associated with a second characteristic that relates to a second preference of the user.

As further shown in FIG. 5, process 500 may include selecting a particular item from the plurality of items based on the plurality of explanation sets, wherein the particular item selected is associated with a particular explanation set of the plurality of explanation sets (block 540). For example, the decision platform (e.g., using computing resource, 225, processor 320, memory 330, storage component 340, and/or the like) may select a particular item from the plurality of items based on the plurality of explanation sets, as described above. In some implementations, the particular item selected may be associated with a particular explanation set of the plurality of explanation sets.

As further shown in FIG. 5, process 500 may include providing information associated with the particular item selected, wherein the information includes the particular explanation set of the particular item selected (block 550). For example, the decision platform (e.g., using computing resource 225, processor 320, memory 330, storage component 340, output component 360, communication interface 370, and/or the like) may provide information associated with the particular item selected, as described above. In some implementations, the information may include the particular explanation set of the particular item selected.

Process 500 may include additional implementations, such as any single implementation or any combination of implementations described below and/or in connection with one or more other processes described elsewhere herein.

In some implementations, the decision platform may generate the plurality of explanation sets by integrating data relating to the user and data relating to the plurality of items. In some implementations, the decision platform may generate a plurality of scores. A score of the plurality of scores may relate to one item of the plurality of items, and the score may be a difference of positive explanations and negative explanations associated with the one item. In some implementations, the decision platform, when selecting the particular item, may select the particular item from the plurality of items based on the plurality of scores. The particular item selected may be associated with a highest score of the plurality of scores. In some implementations, the particular explanation set provides information that identifies one or more reasons that the particular item was selected.

In some implementations, the item may be positively associated with the first characteristic when a first sentiment value for the first characteristic of the item indicates a positive sentiment. The first sentiment value may be a first aggregate sentiment value based on sentiment scoring of unstructured data relating to the first characteristic. In some implementations, the item may be negatively associated with the second characteristic when a second sentiment value for the second characteristic of the item indicates a negative sentiment. The second sentiment value may be a second aggregate sentiment value based on sentiment scoring of unstructured data relating to the second characteristic.

In some implementations, the positive explanation may indicate an association between the first preference of the user, the first characteristic of the item, and a first identifier that the item is positively associated with the first characteristic. In some implementations, the negative explanation may indicate an association between the second preference of the user, the second characteristic of the item, and a second identifier that the item is negatively associated with the first characteristic.

In some implementations, the particular item is a first particular item, the information is first information, and the particular explanation set is a first particular explanation set. In some implementations, the decision platform may receive an update to the plurality of preferences, generate a plurality of updated explanation sets based on the update to the plurality of preferences, select a second particular item from the plurality of items based on the plurality of updated explanation sets, where the second particular item selected may be associated with a second particular explanation set of the plurality of updated explanation sets, and provide second information associated with the second particular item selected that includes the second particular explanation set of the second particular item selected.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
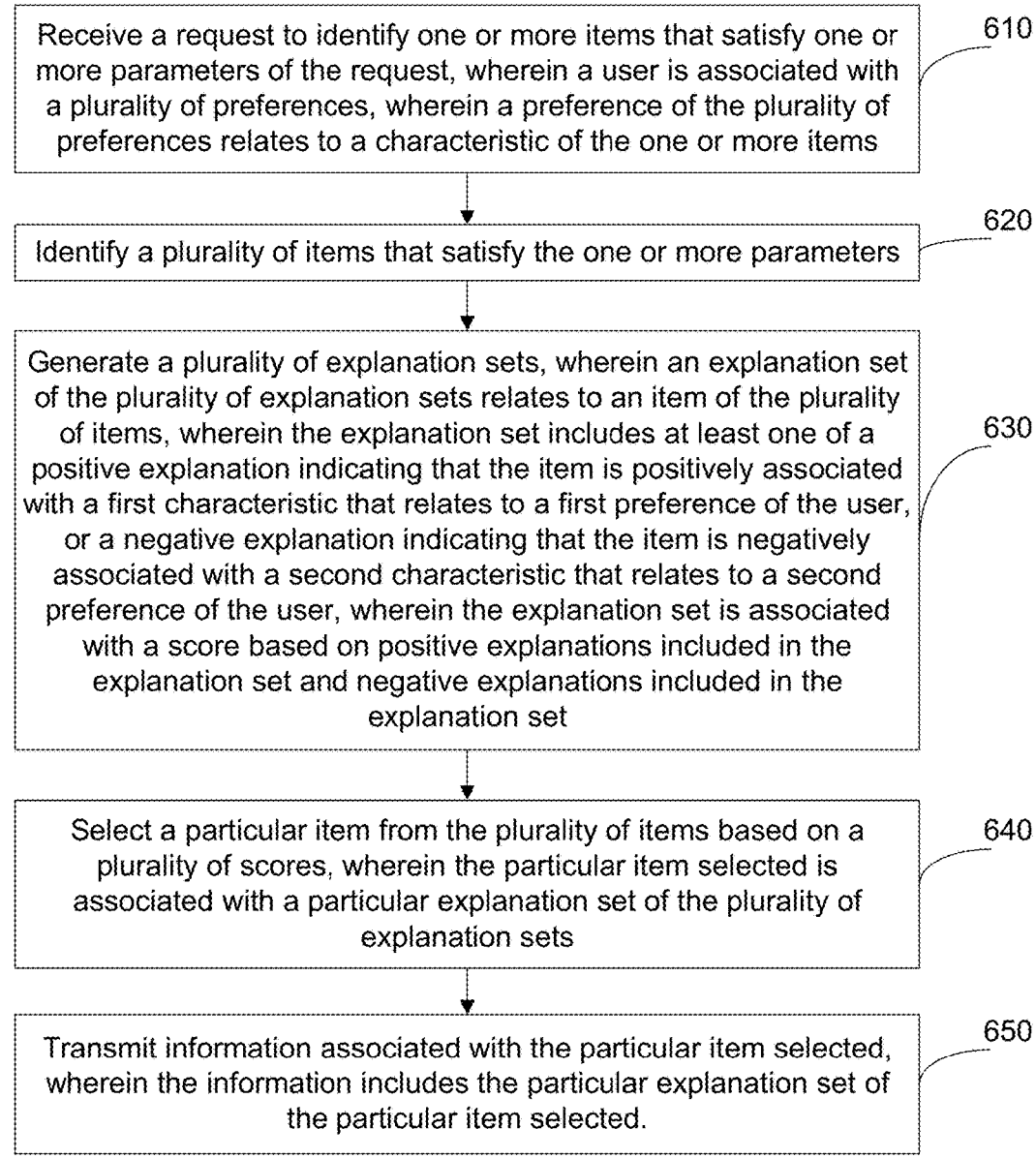

FIG. 6 is a flow chart of an example process 600 for explanation-driven reasoning. In some implementations, one or more process blocks of FIG. 6 may be performed by a decision platform (e.g., decision platform 220). In some implementations, one or more process blocks of FIG. 6 may be performed by another device or a group of devices separate from or including the decision platform, such as user device 210, and/or the like.

As shown in FIG. 6, process 600 may include receiving a request to identify one or more items that satisfy one or more parameters of the request, wherein a user is associated with a plurality of preferences, and wherein a preference of the plurality of preferences relates to a characteristic of the one or more items (block 610). For example, the decision platform (e.g., using computing resource 225, processor 320, memory 330, storage component 340, input component 350, communication interface 370, and/or the like) may receive a request to identify one or more items that satisfy one or more parameters of the request, as described above. In some implementations, a user may be associated with a plurality of preferences. In some implementations, a preference of the plurality of preferences may relate to a characteristic of the one or more items.

As further shown in FIG. 6, process 600 may include identifying a plurality of items that satisfy the one or more parameters (block 620). For example, the decision platform (e.g., using computing resource 225, processor 320, memory 330, storage component 340, and/or the like) may identify a plurality of items that satisfy the one or more parameters, as described above.

As further shown in FIG. 6, process 600 may include generating a plurality of explanation sets, wherein an explanation set of the plurality of explanation sets relates to an item of the plurality of items, wherein the explanation set includes at least one of: a positive explanation indicating that the item is positively associated with a first characteristic that relates to a first preference of the user, or a negative explanation indicating that the item is negatively associated with a second characteristic that relates to a second preference of the user, and wherein the explanation set is associated with a score based on positive explanations included in the explanation set and negative explanations included in the explanation set (block 630). For example, the decision platform (e.g., using computing resource 225, processor 320, memory 330, storage component 340, and/or the like) may generate a plurality of explanation sets, as described above. In some implementations, an explanation set of the plurality of explanation sets may relate to an item of the plurality of items. In some implementations, the explanation set may include at least one of: a positive explanation indicating that the item is positively associated with a first characteristic that relates to a first preference of the user, or a negative explanation indicating that the item is negatively associated with a second characteristic that relates to a second preference of the user. In some implementations, the explanation set may be associated with a score based on positive explanations included in the explanation set and negative explanations included in the explanation set.

As further shown in FIG. 6, process 600 may include selecting a particular item from the plurality of items based on a plurality of scores, wherein the particular item selected is associated with a particular explanation set of the plurality of explanation sets (block 640). For example, the decision platform (e.g., using computing resource, 225, processor 320, memory 330, storage component 340, and/or the like) may select a particular item from the plurality of items based on a plurality of scores, as described above. In some implementations, the particular item selected may be associated with a particular explanation set of the plurality of explanation sets.

As further shown in FIG. 6, process 600 may include transmitting information associated with the particular item selected, wherein the information includes the particular explanation set of the particular item selected (block 650). For example, the decision platform (e.g., using computing resource 225, processor 320, memory 330, storage component 340, output component 360, communication interface 370, and/or the like) may transmit information associated with the particular item selected, as described above. In some implementations, the information may include the particular explanation set of the particular item selected.

Process 600 may include additional implementations, such as any single implementation or any combination of implementations described below and/or in connection with one or more other processes described elsewhere herein.

In some implementations, the score may be based on a first number of positive explanations included in the explanation set and a second number of negative explanations included in the explanation set. In some implementations, the particular explanation set may include one or more positive explanations and one or more negative explanations. In some implementations, the item may be positively associated with the first characteristic when the item has the first characteristic and the item is associated with a first score for the first characteristic that satisfies a threshold value. In some implementations, the item may be negatively associated with the second characteristic when the item has the second characteristic and the item is associated with a second score for the second characteristic that does not satisfy the threshold value.

In some implementations, the decision platform may determine the plurality of preferences associated with the user based on natural language processing of one or more unstructured data items associated with the user. In some implementations, the request may be an unstructured query, and the decision platform may determine the one or more parameters of the request based on natural language processing of the unstructured query.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
  receiving, by a device and from a user device, a request to identify one or more items that satisfy a plurality of parameters of the request,
    wherein the user device is associated with a user,
      wherein the user is associated with a plurality of preferences,
        wherein a preference of the plurality of preferences relates to a characteristic of the one or more items;
  identifying, by the device, a plurality of items that satisfy the plurality of parameters;
  generating, by the device, a plurality of explanation sets,
    wherein an explanation set of the plurality of explanation sets relates to an item of the plurality of items,
      wherein the explanation set includes at least one of:
        a positive explanation indicating that the item is positively associated with a first characteristic that relates to a first preference of the user, or
        a negative explanation indicating that the item is negatively associated with a second characteristic that relates to a second preference of the user,
      wherein the explanation set includes a particular identifier of a particular preference, of the plurality of preferences, relating to the characteristic based on a percentile, and
      wherein the explanation set provides an explanation of why the item was identified, based on using machine learning, to be associated with satisfying the plurality of parameters,
        wherein the explanation set includes information identifying an identified characteristic of the item and how it relates to an identified preference of the user;
  selecting, by the device, a particular item from the plurality of items based on the plurality of explanation sets,
    wherein the particular item selected is associated with a particular explanation set of the plurality of explanation sets; and
  transmitting, by the device and to the user device, information associated with the particular item selected,
    wherein the information includes the particular explanation set of the particular item selected.

2. The method of claim 1, wherein selecting the particular item comprises:
  generating a plurality of scores,
    wherein a score of the plurality of scores relates to one item of the plurality of items,
      wherein the score is a ratio of positive explanations to negative explanations associated with the one item; and
  selecting the particular item from the plurality of items based on the plurality of scores,
    wherein the particular item selected is associated with a highest score of the plurality of scores.

3. The method of claim 1, wherein the explanation set includes one or more positive explanations and one or more negative explanations.

4. The method of claim 1, wherein the item is positively associated with the first characteristic when a first sentiment value for the first characteristic of the item indicates a positive sentiment,
  wherein the item is negatively associated with the second characteristic when a second sentiment value for the second characteristic of the item indicates a negative sentiment.

5. The method of claim 1, wherein the particular explanation set provides information that identifies one or more reasons that the particular item was selected.

6. The method of claim 1, further comprising:
  determining the plurality of preferences associated with the user based on natural language processing of unstructured data associated with the user.

7. The method of claim 1, wherein the request is an unstructured query,
  wherein the method further comprises:
    determining the plurality of parameters of the request based on natural language processing of the unstructured query.

8. A device, comprising:
  one or more memories; and
  one or more processors, communicatively coupled to the one or more memories, to:
    receive, from a user, a request to identify one or more items that satisfy a plurality of parameters of the request,
      wherein the user is associated with a plurality of preferences,
        wherein a preference of the plurality of preferences relates to a characteristic of the one or more items;
    identify a plurality of items that satisfy the plurality of parameters;
    generate a plurality of explanation sets,
      wherein an explanation set of the plurality of explanation sets relates to an item of the plurality of items,
        wherein the explanation set includes at least one of:
          a positive explanation indicating that the item is positively associated with a first characteristic that relates to a first preference of the user, or a negative explanation indicating that the item is negatively associated with a second characteristic that relates to a second preference of the user,
wherein the explanation set includes a particular identifier of a particular preference, of the plurality of preferences, relating to the characteristic based on a percentile, and
wherein the explanation set provides an explanation of why the item was identified, based on using machine learning, to be associated with satisfying the plurality of parameters,
wherein the explanation set includes information identifying an identified characteristic of the item and how it relates to an identified preference of the user;
select a particular item from the plurality of items based on the plurality of explanation sets,
wherein the particular item selected is associated with a particular explanation set of the plurality of explanation sets; and
provide, to the user, information associated with the particular item selected,
wherein the information includes the particular explanation set of the particular item selected.

9. The device of claim 8, wherein the one or more processors, when generating the plurality of explanation sets, are to:
generate the plurality of explanation sets by integrating data relating to the user and data relating to the plurality of items.

10. The device of claim 8, wherein the one or more processors, when selecting the particular item, are to:
generate a plurality of scores,
wherein a score of the plurality of scores relates to one item of the plurality of items,
wherein the score is a ratio of positive explanations to negative explanations associated with the one item; and
select the particular item from the plurality of items based on the plurality of scores,
wherein the particular item selected is associated with a highest score of the plurality of scores.

11. The device of claim 8, wherein the particular explanation set provides information that identifies one or more reasons that the particular item was selected.

12. The device of claim 8, wherein the item is positively associated with the first characteristic when a first sentiment value for the first characteristic of the item indicates a positive sentiment,
wherein the first sentiment value is a first aggregate sentiment value based on sentiment scoring of unstructured data relating to the first characteristic, and
wherein the item is negatively associated with the second characteristic when a second sentiment value for the second characteristic of the item indicates a negative sentiment,
wherein the second sentiment value is a second aggregate sentiment value based on sentiment scoring of unstructured data relating to the second characteristic.

13. The device of claim 8, wherein the positive explanation indicates an association between the first preference of the user, the first characteristic of the item, and a first identifier that the item is positively associated with the first characteristic,
wherein the negative explanation indicates an association between the second preference of the user, the second characteristic of the item, and a second identifier that the item is negatively associated with the first characteristic.

14. The device of claim 8, wherein the particular item is a first particular item, the information is first information, and the particular explanation set is a first particular explanation set,
wherein the one or more processors are further to:
receive an update to the plurality of preferences;
generate a plurality of updated explanation sets based on the update to the plurality of preferences;
select a second particular item from the plurality of items based on the plurality of updated explanation sets,
wherein the second particular item selected is associated with a second particular explanation set of the plurality of updated explanation sets; and
provide second information associated with the second particular item selected,
wherein the second information includes the second particular explanation set of the second particular item selected.

15. A non-transitory computer-readable medium storing instructions, the instructions comprising:
one or more instructions that, when executed by one or more processors, cause the one or more processors to:
receive, from a user device, a request to identify one or more items that satisfy a plurality of parameters of the request,
wherein the user device is associated with a user,
wherein the user is associated with a plurality of preferences,
wherein a preference of the plurality of preferences relates to a characteristic of the one or more items;
identify a plurality of items that satisfy the plurality of parameters;
generate a plurality of explanation sets,
wherein an explanation set of the plurality of explanation sets relates to an item of the plurality of items,
wherein the explanation set includes at least one of:
a positive explanation indicating that the item is positively associated with a first characteristic that relates to a first preference of the user, or
a negative explanation indicating that the item is negatively associated with a second characteristic that relates to a second preference of the user,
wherein the explanation set is associated with a score based on positive explanations included in the explanation set and negative explanations included in the explanation set,
wherein the explanation set includes a particular identifier of a particular preference, of the plurality of preferences, relating to the characteristic based on a percentile, and
wherein the explanation set provides an explanation of why the item was identified, based on using machine learning, to be associated with satisfying the plurality of parameters,
wherein the explanation set includes information identifying an identified characteristic of the item and how it relates to an identified preference of the user;

select a particular item from the plurality of items based on a plurality of scores,
   wherein the particular item selected is associated with a particular explanation set of the plurality of explanation sets; and
transmit, to the user device, information associated with the particular item selected,
   wherein the information includes the particular explanation set of the particular item selected.

16. The non-transitory computer-readable medium of claim 15, wherein the score is based on a first number of positive explanations included in the explanation set and a second number of negative explanations included in the explanation set.

17. The non-transitory computer-readable medium of claim 15, wherein the particular explanation set includes one or more positive explanations and one or more negative explanations.

18. The non-transitory computer-readable medium of claim 15, wherein the item is positively associated with the first characteristic when the item has the first characteristic and the item is associated with a first score for the first characteristic that satisfies a threshold value,
wherein the item is negatively associated with the second characteristic when the item has the second characteristic and the item is associated with a second score for the second characteristic that does not satisfy the threshold value.

19. The non-transitory computer-readable medium of claim 15, wherein the one or more instructions, when executed by the one or more processors, further cause the one or more processors to:
determine the plurality of preferences associated with the user based on natural language processing of one or more unstructured data items associated with the user.

20. The non-transitory computer-readable medium of claim 15, wherein the request is an unstructured query,
wherein the one or more instructions, when executed by the one or more processors, further cause the one or more processors to:
determine the plurality of parameters of the request based on natural language processing of the unstructured query.

* * * * *